(12) United States Patent
Kodera

(10) Patent No.: US 6,326,533 B1
(45) Date of Patent: Dec. 4, 2001

(54) JOINING ELEMENT, AND WIND INSTRUMENT WITH SUCH JOINING ELEMENT

(76) Inventor: Wolf Kodera, Gartenstrasse 6, Witten, 58452 (DE)

(*) Notice: Subject to any disclaimer, the term of this patent is extended or adjusted under 35 U.S.C. 154(b) by 0 days.

(21) Appl. No.: 09/412,663

(22) Filed: Oct. 5, 1999

(51) Int. Cl.$^7$ ............................................. G10D 7/08
(52) U.S. Cl. ........................................ 84/385 P; 84/380 R
(58) Field of Search ............................... 84/385 P, 380 R

(56) References Cited

U.S. PATENT DOCUMENTS

| | | | |
|---|---|---|---|
| 1,702,962 | 2/1929 | Buescher | 84/380 R |
| 1,727,868 | 9/1929 | Dreves | 84/380 R |
| 3,421,399 | * 1/1969 | Greenleaf et al. | 84/385 P |
| 3,688,633 | 9/1972 | Nagao | 84/380 R |
| 4,704,939 | 11/1987 | Staubinger | 84/385 P |
| 4,967,632 | 11/1990 | Etheredge et al. | 84/385 P |
| 5,417,135 | 5/1995 | Staubinger | 84/385 P |
| 5,945,643 | * 8/1999 | Casser | 181/290 |
| 6,054,532 | * 4/2000 | Wang et al. | 525/66 |
| 6,070,381 | * 6/2000 | Blumer | 52/403.1 |

FOREIGN PATENT DOCUMENTS

| | | |
|---|---|---|
| 1 903 244 | 1/1969 | (DE) . |
| 93 17 477.2 | 3/1994 | (DE) . |
| 197 01 972 | 7/1998 | (DE) . |
| 1.034.063 | 7/1953 | (FR) . |
| 2 615 646 | 5/1987 | (FR) . |
| 499979 | 2/1939 | (GB) . |
| 717902 | 11/1954 | (GB) . |
| WO 96/21923 | 7/1996 | (WO) . |
| Wo 98/32119 | 7/1998 | (WO) . |

* cited by examiner

Primary Examiner—Shih-Yung Hsieh
(74) Attorney, Agent, or Firm—Merchant & Gould P.C.

(57) ABSTRACT

Joining element for joining two components, whereby the joining element displays a central part made of a first material displaying self-damping (properties), as well as a damping member surrounding the central part made, in contrast, of a softer material; and whereby the central part displays a first end designated as the base, as well as a second end having a smaller circumferential surface relative to the base; and whereby the dampling member surrounds the central part in interlocking fashion, at least in the region of the second end; and whereby the central part displays a contour with an undercut running from the base to the second end, into which the damping member extends.

9 Claims, 2 Drawing Sheets

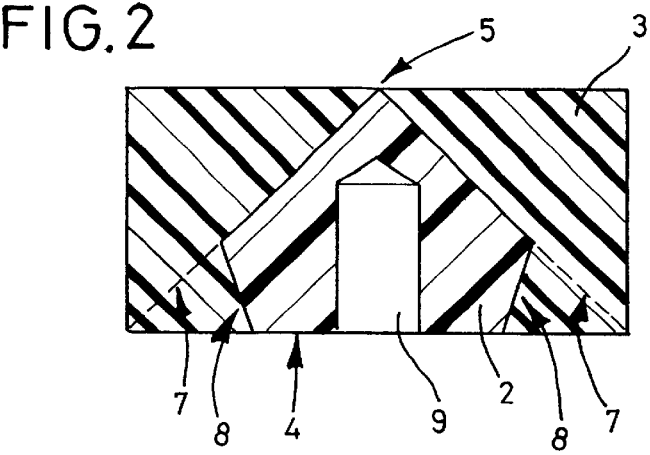
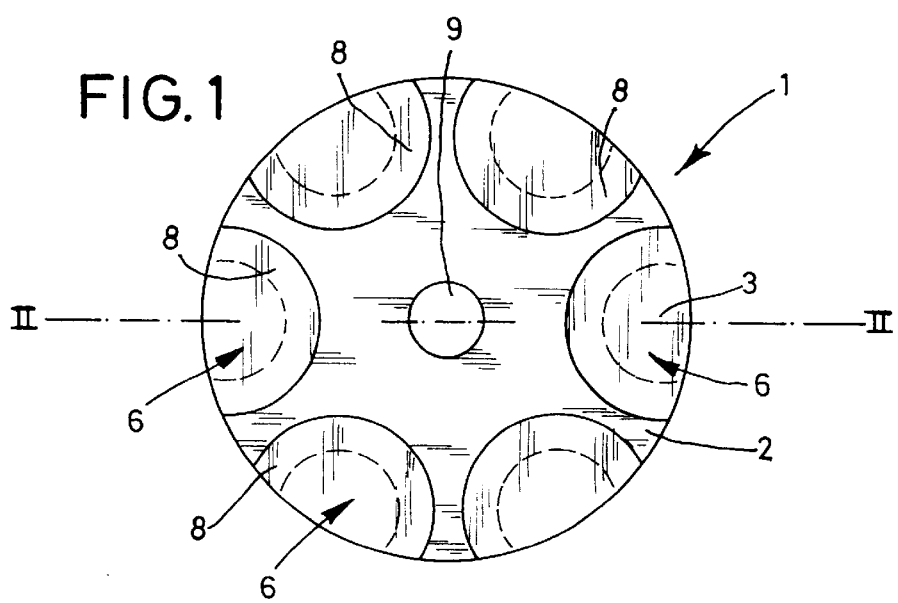
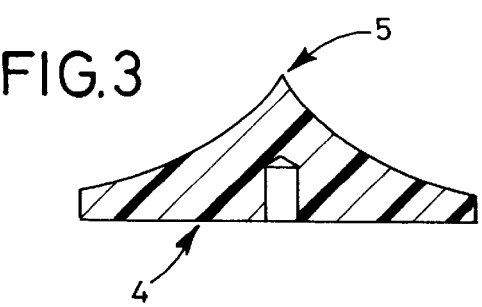
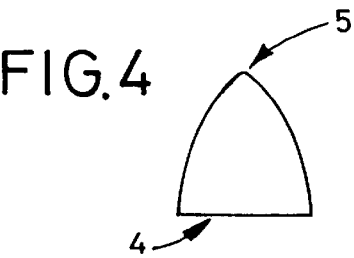

JOINING ELEMENT, AND WIND INSTRUMENT WITH SUCH JOINING ELEMENT

BACKGROUND

The invention concerns a joining element for joining two components

It is frequently desired to uncouple two components in as much as possible in swinging fashion, so that impacts or shocks acting on one component are not, or only in as small a portion as possible, transferred to the second component. Known in particular are applications where a certain amount of mobility is desired, e.g. a tilting (rocking) movement of one component relative to the other.

By use of very soft, cushion-like elements it is actually possible to achieve a desired damping, however, in doing this, the precision of position with which the components are aligned to each other is impaired. In particular, undesired parallel displacements of the two components relative to each other frequently can not be excluded.

The object of the invention is to obtain a joining element for joining two components, which enables good impact damping, permits a tilting movement of both components and that simultaneously reliably guides both components, so that parallel displacements of the two components relative to one another are reduced or impossible.

SUMMARY

This task underlying the invention is resolved by a joining element with the features of claim 1.

In other words, the invention proposes a joining element that consists of a central part and an outer damping member. The central part consists of a comparatively harder material in comparison to the damping member, whereby, however, this comparatively harder material of the central part displays a self-damping, consisting, e.g., not of a solid metal but rather of foam metal or, in particular, of plastic.

However, the actual damping function does not belong to the central part. It is formed in a known way more as a hard element and serves as a support that defines the distance between the two components to be joined, and that enables a tilting movement relative to each other of the two components to be joined, whereby the end with the smaller diameter can be used as the pivot for a balance and defines the tilt-point. In comparison to this, the damping member is formed as a known soft element and enables uncoupling the two components to be joined in a swinging fashion.

The central part displays a broader base as a first end for enabling attachment to a first component, and displays on the oppositely-lying other end, which is adjacent to the second of the two components to be joined, a lesser circumference, hence formed more "pointy" in comparison to the base. Aside from the properties of the material, this shaping promotes the damping action of the central part.

The central part is surrounded by a damping member that is softer compared to the central part, and displays better damping properties than the central part.

Due to the fact that the damping member grips about the central part in interlocking fashion, at least in the region of its second end, the introduction of vibrations in the second component is avoided to a very great extent. Additionally, the damping member produces a lateral guidance for the second end of the central part. Parallel displacements between the first and second component that could be provoked by bending of the central part, in particular in its region where the material is reduced at its second end, are therewith avoided, or at least considerably reduced.

Advantageously, the central part can display an undercut into which the damping member extends. In this way, an adhesive-free joining between the central part and the damping member is capable of being accomplished. That is to say, gluing possibly produces a hardening of the damping member in its edge region adjacent to the adhesive, so that, with the adhesive-free joining of central part and damping member, damping behavior of the joining element is improved.

Advantageously, the circumference of the central part can become constantly, or at least essentially constantly, ever greater from the second end toward the base. Through means of this non-prismatic shaping, the self-damping behavior is influenced in a positive manner, and transference of vibration between the two components is rendered more difficult.

The damping member surrounding the central part can advantageously consist of easily glueable material. By this means, it becomes possible to configure the second end of the central part lying oppositely to the base almost punctiform, so that there results here a swinging coupling to the second component with only minimum force.

Yet, a comparatively large surface of the damping member is capable of being provided here for good connection of the joining element with the second component, where the damping member lies against the central part in interlocking fashion, so that a large surface gluing will be enabled and, therewith, a positive joining with the component provided there. If the joining element is to be joined at this place with a metallic component, the already-mentioned possible hardening of the damping member at that location where it is to be glued to another object represents no great drawback. This possibly hardened area of the damping element is always still softer than the material of the metallic component, so that a stepwise hardness transition from the damping member over the layer of adhesive to the metallic component is achieved.

Advantageously, the central part can consist of polypropylene. It has been shown that this material displays an outstanding self-damping, at the same time an outstanding strength in order to guarantee the guidance of the two components to be joined.

In accordance with the invention, the joining element can advantageously find application as the damping member of a valve in the case of a musical instrument, especially in the case of a wind instrument for closure of a note hole. Here, usually provided is a movable support on which the valve is arranged, and that can be actuated to lift the valve from the note hole or to place it on the note hole in sealing fashion. The second, more pointed end of the central part opposite the base guarantees a tilting movement of the valve relative to the support. This tilting movement assures that impacts or shocks that act on the valve or on the support, and that foreseeably could occur during operation, can not lead to a misplacement of the valve that prevents reliable sealing of the note hole.

BRIEF DESCRIPTION OF THE DRAWINGS

Examples of embodiment of the invention will be explained in more detail in the following with the aid of the drawings. Shown are:

FIG. 1 a view from below onto a first example of embodiment of a joining element, FIG. 2 a section through the joining element of FIG. 1 along the line II—II, and FIGS. 3 and 4 two examples of embodiment of central parts for joining elements in accordance with the invention.

DETAILED DESCRIPTION OF THE INVENTION

Figure 5:
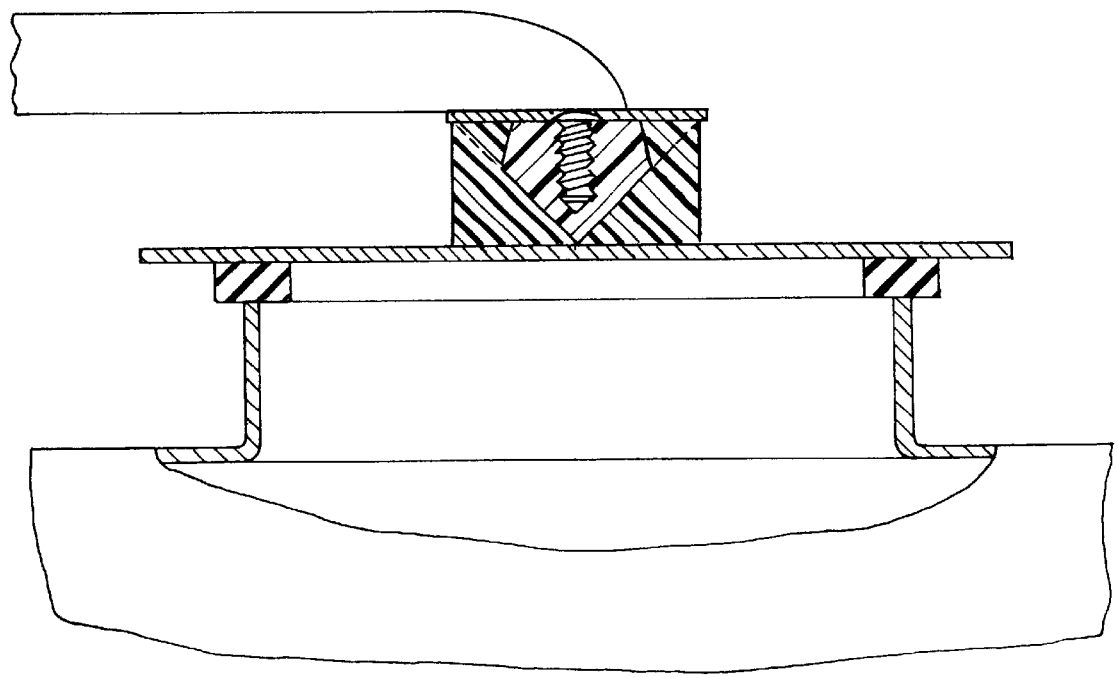
FIG. 5 A view of a wind instrument with joining element.

Represented in FIG. 1 is the under side of a joining element, designated generally with 1, where the concept "under" relates to the orientation of the joining element 1 in the drawing, which is, however, no strictly prescribed or preferred orientation. The joining element 1 consists of a central part 2 and a damping member 3. The central part 2 displays on its under side a broad base 4 that represents the first end of the central part 2, and that extends over the entire width, or rather the entire diameter of the joining element 1. Cutouts 6 of the central part 2 are formed in circle-section fashion, so that there results in each case between two cutouts of this type 6 finger-like projections of the central part 2.

The section of FIG. 2 runs through two such cutouts 6. A second end 5 of central part 2 is formed as a point. The central part 2 runs with a cone-shaped surface from its pointed, second end 5, up to the base 4, whereby, in the region of the mentioned finger-like projections, the base extends over the entire width of the joining element 1. The course of this contour of the central part 2 can be seen in FIG. 2 by means of the broken lines 7.

In the region of the cutouts 6, the central part 2 displays undercuts 8, with the damping member 3 extending into these undercuts and, thereby, guarantees a interlocking bond with the central part 2, so that a joining element to be manipulated as one piece is then achieved when no other joining, as for example gluing, is provided between the central part 2 and the damping member 3.

The central part 2 advantageously consists of propylene, a material that displays good self-damping properties. It is, however, poorly gluable, so that attachment of the joining element 1 to a first component adjacent to the base 4 in the form of a screw connection can be accomplished with the aid of a central drill hole 9 for accepting the screw.

The surrounding damping member 3 consists, on the other hand, of a very goodgluable material, so that, at the end of the joining element 1 on which the second end 5 of the central part 2 is provided, the joining element 1 can be glued there with a second, adjacent component.

The non-prismatic shaping of the central part 2 improves its self-damping characteristic. FIGS. 3 and 4 show purely schematic, alternative shapes of the central part 2 which guarantee that the second end 5 displays considerably less circumference relative to the base 4, and ends in a cone, or rather a point. In this manner a tilting (swinging) movement placement of the second component is possible.

This tilting movement placement can be desired, for example, in the case of the mounting of valves that serve for closure of note holes in the case of wind instruments. However, parallel displacement of the two components relative to one another is practically excluded, since there where the central part 2 displays its greatest deformability, namely in the region of the second end 5, the damping member 3 displays the greatest mass of metal, and therewith enables the best supporting action. Additionally, the shape of the central part itself, which is not formed as a thin rod or the like, enables good stability against those types of deformations that would permit a parallel displacement of the two components that are to be joined with one another. Relative to this, the circumference of the central part 2 increasingly expanding out from the second end 5 produces a high measure of stability.

What is claimed is:

1. Joining element for joining two components, whereby the joining element has a central part made of a first material having self-damping properties, as well as a damping member surrounding the central part made of a softer material; and whereby the central part has a first end designated as the base, as well as a second end having a smaller circumferential surface relative to the base; and whereby the damping member surrounds the central part in interlocking fashion, at least in the region of the second end; and whereby the central part has a contour with an undercut running from the base to the second end, into which the damping member extends, and whereby the damping member provides, at the end of the joining element on which the second end of the central part is provided, a surface with which the joining element is configured to be glued with an adjacent component.

2. Joining element according to claim 1, wherein the circumference of the central part increases essentially constantly from the second end toward the base.

3. Joining element according to claim 1, wherein the damping member consists of a material that is well gluable.

4. Joining element according to claim 1, wherein the central part consists of polypropylene.

5. Wind instrument, with at least one valve as a closure for at least one note hole, and with a moveable support on which is fixed a valve, wherein the valve is fixed to the support by means of a joining element, whereby the joining element has a central part made of a first material having self-damping properties, as well as a damping member surrounding the central part made of a softer material; and whereby the central part has a first end designated as the base, as well as, a second end having a smaller circumferential surface relative to the base; and whereby the damping member surrounds the central part in interlocking fashion, at least in the region of the second end; and whereby the central part has a contour with an undercut running from the base to the second end, into which the damping member extends.

6. A wind instrument having a joining element, the joining element comprising: a central part made of a first material having self-damping properties, as well as a damping member surrounding the central part made of a softer material; and whereby the central part has a first end designated as the base, as well as a second end having a smaller circumferential surface relative to the base; and whereby the damping member surrounds the central part in interlocking fashion, at least in the region of the second end; and whereby the central part has a contour with an undercut running from the base to the second end, into which the damping member extends, and whereby the damping member provides, at the end of the joining element on which the second end of the central part is provided, a surface with which the joining element is configured to be glued with an adjacent component.

7. A wind instrument according to claim 6, wherein the circumference of the central part of the joining element increases essentially constantly from the second end toward the base.

8. A wind instrument according to claim 7, wherein the damping member of the joining element consists of a material that is well gluable.

9. A wind instrument according to claim 8, wherein the central part of the joining element consists of polypropylene.

* * * * *